(12) United States Patent
Asakura

(10) Patent No.: US 9,961,485 B2
(45) Date of Patent: May 1, 2018

(54) COMMUNICATION DEVICE

(71) Applicant: BROTHER KOGYO KABUSHIKI KAISHA, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days. days.

(21) Appl. No.: 15/471,335

(22) Filed: Mar. 28, 2017

(65) Prior Publication Data
US 2017/0289743 A1    Oct. 5, 2017

(30) Foreign Application Priority Data

Mar. 31, 2016  (JP) .................................. 2016-071817

(51) Int. Cl.
  H04B 5/00   (2006.01)
  H04W 4/00   (2018.01)
  H04W 76/02  (2009.01)

(52) U.S. Cl.
  CPC ......... H04W 4/008 (2013.01); H04W 76/023 (2013.01)

(58) Field of Classification Search
  CPC ............................ H04W 4/008; H04W 76/023
  USPC ...................................................... 455/41.1
  See application file for complete search history.

(56) References Cited

U.S. PATENT DOCUMENTS

| 2014/0038519 A1 | 2/2014 | Asakura |
| 2015/0092225 A1 | 4/2015 | Kaigawa |
| 2015/0093992 A1* | 4/2015 | Tanaka ..................... H04B 7/26 455/41.2 |
| 2015/0382135 A1 | 12/2015 | Kawahara et al. |
| 2017/0026783 A1 | 1/2017 | Asakura |

FOREIGN PATENT DOCUMENTS

| JP | 2007-004540 A | 1/2007 |
| JP | 2014-032579 A | 2/2014 |
| JP | 2015-069458 A | 4/2015 |
| JP | 2016-010117 A | 1/2016 |

OTHER PUBLICATIONS

2010 Wi-Fi Alliance, Wi-Fi Peer-to-Peer (P2P) Technical Specification Version 1.1.

* cited by examiner

Primary Examiner — Ayodeji Ayotunde
(74) Attorney, Agent, or Firm — Scully, Scott, Murphy & Presser, PC

(57) ABSTRACT

A communication device may perform a predetermined communication using a first type communication link via a wireless interface with the target device being a first type device, determine, by using attribute information, which of the first type device or a second type device the target device is, execute an authentication of the target device being the second type device, disconnect the second type communication link without executing an authentication of the target device in a case where it is determined that the target device is the first type device, and perform the predetermined communication using the first type communication link via the wireless interface with the target device being the first type device in a case where the first type communication link is established between the communication device and the target device being the first type device after the second type communication link has been disconnected.

13 Claims, 8 Drawing Sheets

FIG. 4

| Communication Type | | Determination Method | Target Device | Usable or Not |
|---|---|---|---|---|
| Type A | | Not Supporting ISO_DEP | Authentication Card of Mifare Type | Usable |
| | | Supporting ISO_DEP and Data Size=7bytes | Authentication Card of Mifare Desfire Type | Usable |
| | | Supporting ISO_DEP and Data Size=4bytes | Mobile Terminal | Not Usable |
| Type B | | - | Authentication Card or Mobile Terminal | Not Usable |
| Type F | | IC Type is Predetermined Type | Mobile Terminal | Not Usable |
| | | IC Type is not Predetermined Type | Authentication Card | Usable |
| Type V | | - | Authentication Card | Usable |

FIG. 5

Type A

SENS Signal ( Data Size )

SDD Signal ( NFCID1 )

SEL Signal ( 6thbit:ON or OFF
7thbit:ON or OFF )

Type B

SENSB Signal ( NFCID0 )

Type F

SENSF Signal ( P2P Support:ON or OFF
PAD0
NFCID2 )

Type V

Inventory Signal ( UID )

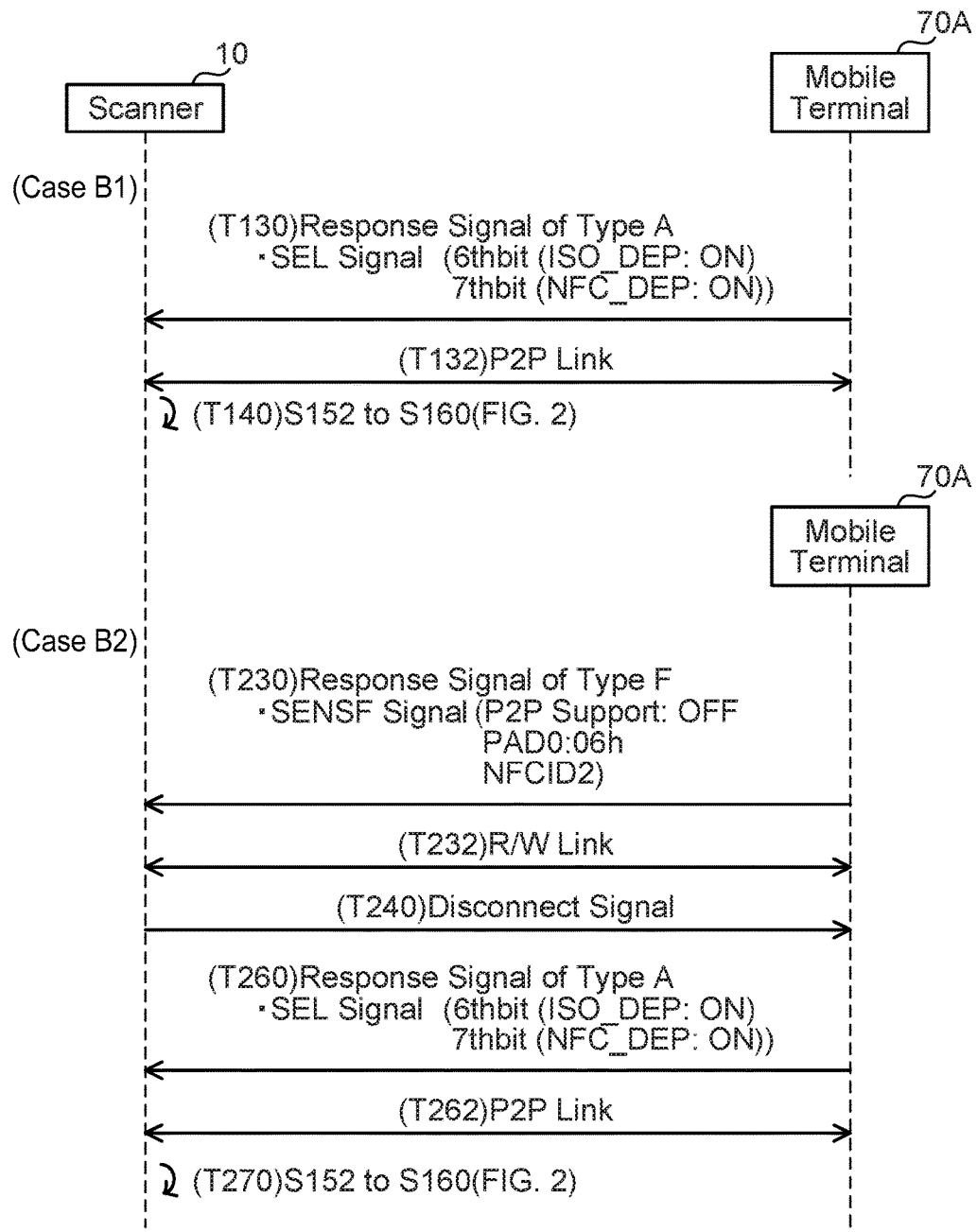

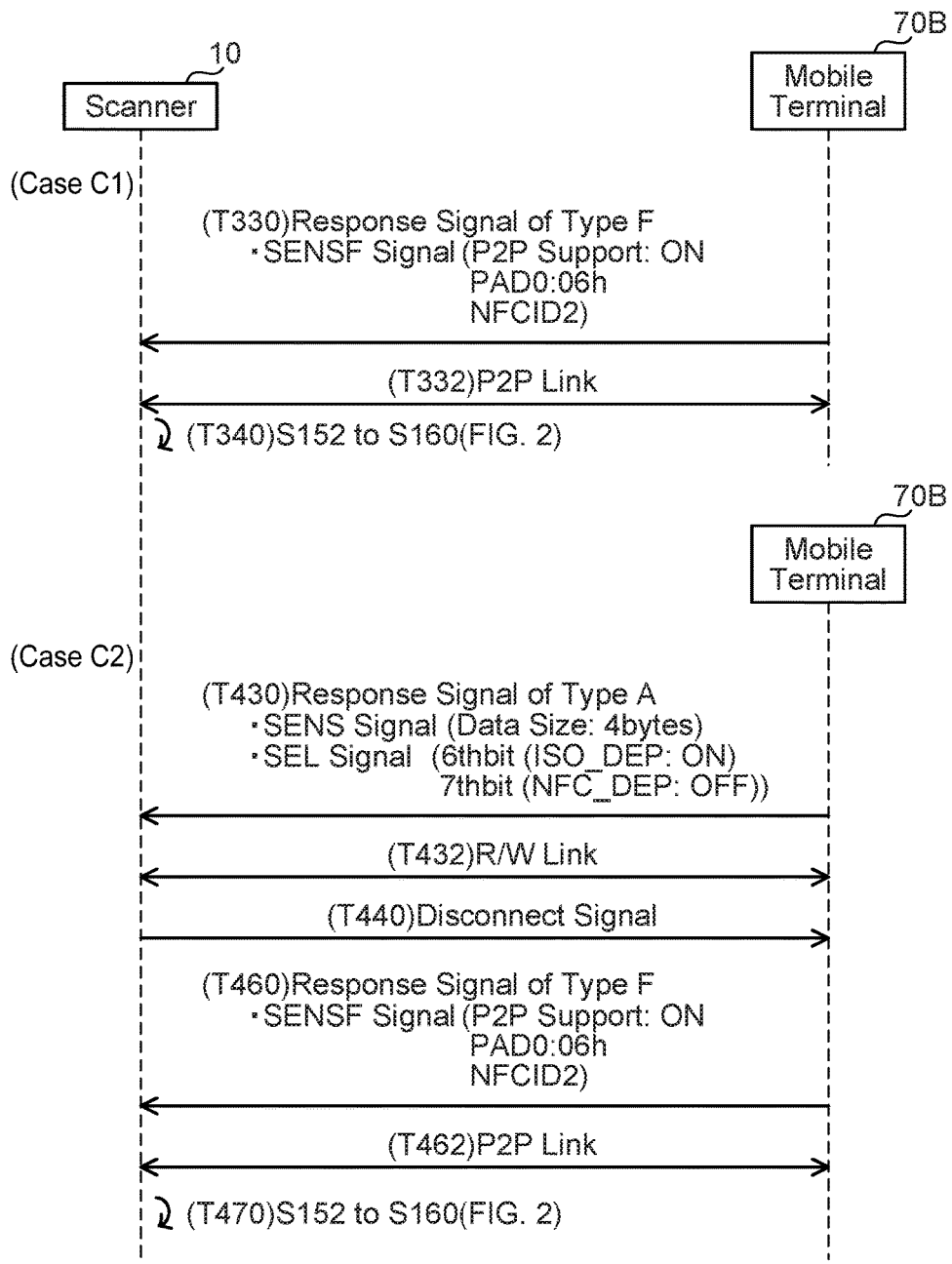

COMMUNICATION DEVICE

TECHNICAL FIELD

The present disclosure relates to a communication device that performs a wireless communication with a plurality of types of communication partner.

BACKGROUND ART

A communication system is known which includes an MFP (abbreviation of Multi-Function Peripheral), a mobile terminal, and an IC card. In this type of communication system, in a case where a communication partner is the mobile terminal, a P2P (abbreviation of Peer to Peer) communication link is established, and consequently the MFP performs a function complying with a function performing instruction received from the mobile terminal. On the other hand, in a case where the communication partner is the IC card, a Reader-CE (abbreviation of Card Emulation) communication link is established, and consequently the MFP performs a login process by using a user ID received from the IC card.

SUMMARY

In the communication system described above, in the case where, e.g., the communication partner is the mobile terminal, a specific communication link (the P2P communication link) may not always be established, but a communication link (e.g., a Reader-CE communication link) different from the specific communication link may be established. In this case, despite being in a situation where a function that complies with the function performing instruction received from the mobile terminal should be performed, the MFP cannot perform the function.

The present disclosure relates to a technique that may allow a communication device to perform an appropriate process complying with the type of communication partner.

A communication device may comprise a wireless interface configured to perform a wireless communication according to a predetermined standard; a processor; and a memory storing computer-readable instructions therein, the computer-readable instructions, when executed by the processor, may cause the communication device to: perform a predetermined communication using a first type communication link via the wireless interface with a target device being a first type device in a case where the first type communication link via the wireless interface is established between the communication device and the target device, the first type communication link being for the communication device to operate in a first mode defined by the predetermined standard; determine, by using attribute information included in a specific signal that is received from the target device for establishing a second type communication link, which of the first type device or a second type device the target device is, in a case where the second type communication link via the wireless interface is established between the communication device and the target device, the second type communication link being for the communication device to operate in a second mode different from the first mode and defined by the predetermined standard; execute an authentication of the target device being the second type device by using identification information included in the specific signal in a case where it is determined that the target device is the second type device; disconnect the second type communication link without executing an authentication of the target device in a case where it is determined that the target device is the first type device; and perform the predetermined communication using the first type communication link via the wireless interface with the target device being the first type device in a case where the first type communication link via the wireless interface is established between the communication device and the target device being the first type device after the second type communication link has been disconnected due to the determining that the target device is the first type device.

A control method, computer-readable instructions, and a non-transitory computer-readable medium storing the computer-readable instructions, for implementation of the aforementioned communication device are also novel and useful. Further, a communication system which comprises the aforementioned communication device and a target device, are also novel and useful.

BRIEF DESCRIPTION OF THE DRAWINGS

FIG. 4 shows a table for describing a method for determining device type;
FIG. 5 shows response signals corresponding to communication types;
FIG. 7 shows a sequence view of a case where a P2P link is established with a mobile terminal corresponding to type A;
and
FIG. 8 shows a sequence view of a case where a P2P link is established with a mobile terminal corresponding to type F.

EMBODIMENTS (Configuration of Communication System 2; FIG. 1)
As shown in FIG. 1, a communication system 2 comprises a scanner 10, an authentication card 50, and a mobile terminal 70. The devices 10, 50, 70 are capable of performing a wireless communication (called "NFC (abbreviation of Near Field Communication) communication" below) according to the NFC system.

Figure 1:
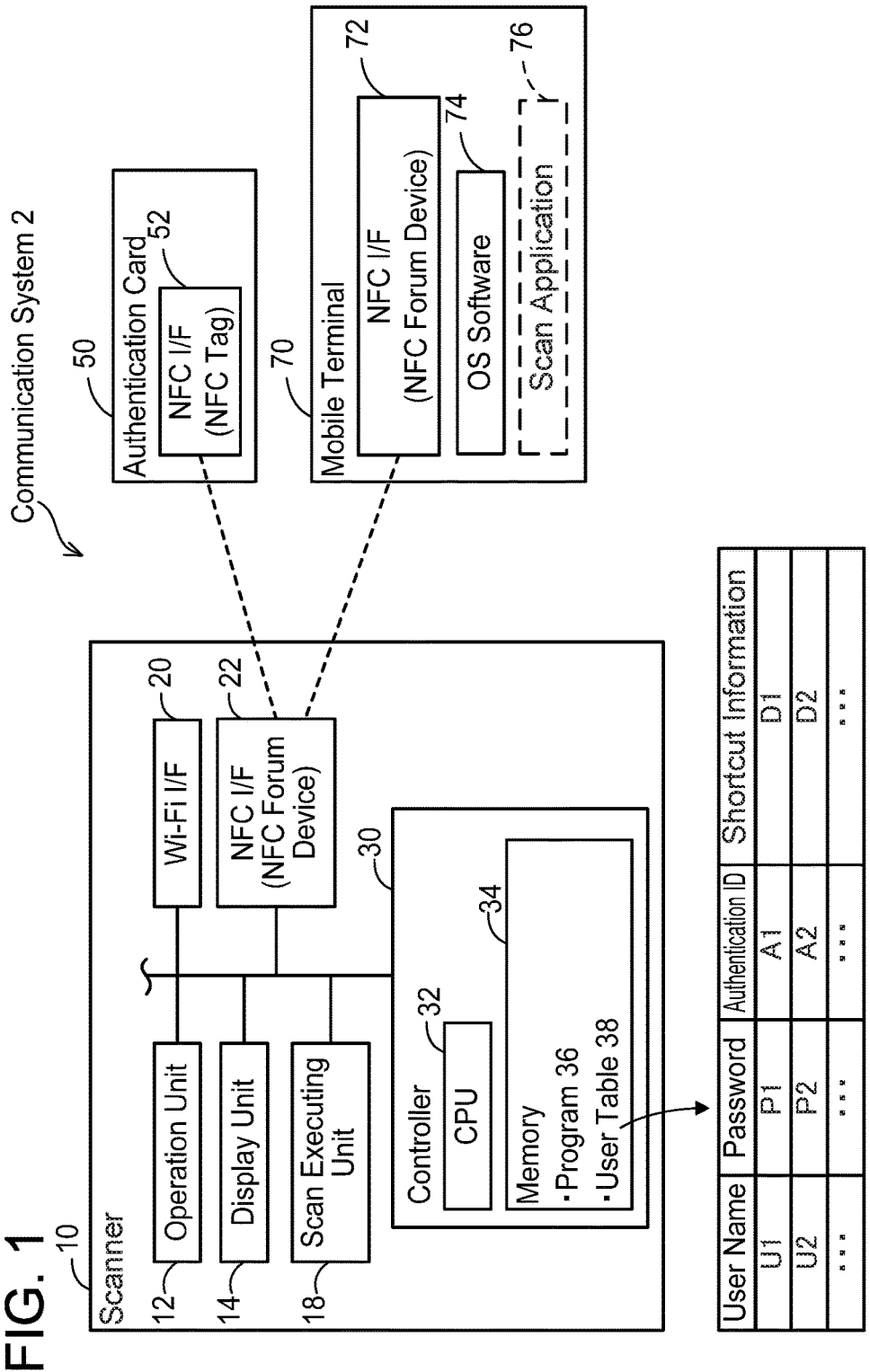
FIG. 1 shows configuration of a communication system.

(Configuration of Scanner 10)
The scanner 10 comprises an operation unit 12, a display unit 14, a scan executing unit 18, a Wi-Fi interface (interface is described as "I/F" below) 20, an NFC I/F 22, and a controller 30.

The operation unit 12 comprises a plurality of keys. A user can input various instructions to the scanner 10 by operating the operation unit 12. The display unit 14 is a display for displaying various information. The display unit 14 also functions as a so-called touch panel. That is, the display unit 14 also functions as an operation unit. The scan executing unit 18 comprises a scanning mechanism such as CCD, CIS, etc.

The Wi-Fi I/F 20 is an I/F for performing a wireless communication (called "Wi-Fi communication" below) according to the Wi-Fi system. The Wi-Fi system is a wireless communication system based on e.g., IEEE (abbreviation of The Institute of Electrical and Electronics Engineers, Inc.) standard 802.11 and standards conforming thereto (e.g., 802.11a, 11b, 11g, 11n, etc.). More specifically, the Wi-Fi I/F 20 supports the WFD (abbreviation of Wi-Fi Direct (registered trademark)) system developed by the Wi-Fi Alliance. The WFD system is a wireless communication system described in the standard document "Wi-Fi Peer-to-Peer (P2P) Technical Specification Version1.1" created by the Wi-Fi Alliance.

The NFC I/F 22 is an I/F for performing an NFC communication. The NFC system is a wireless communication system based on e.g., international standards such as ISO/IEC14443, 15693, 18092, etc. Moreover, an I/F called an NFC forum device and an I/F called an NFC tag are known as types of I/F for performing an NFC communication. The NFC forum device is an I/F capable of selectively operating in any of P2P (abbreviation of Peer To Peer) mode, R/W (abbreviation of Reader/Writer) mode, and CE (abbreviation of Card Emulation) mode. The NFC tag is not an I/F capable of selectively operating in any of these modes, and functions as an IC (abbreviation of Integrated Circuit) tag of the NFC system.

P2P mode is a mode for performing bidirectional communication between one NFC apparatus operating in P2P mode and another NFC apparatus operating in P2P mode. R/W mode and CE mode are modes for performing unidirectional communication between one NFC apparatus operating in R/W mode and another NFC apparatus operating in CE mode. Moreover, CE mode includes normal CE mode requiring a secure element, and HCE (abbreviation of Host Card Emulation) mode not requiring a secure element. The Reader mode in the R/W mode is a mode for reading data from an NFC apparatus operating in CE mode. The Writer mode in the R/W mode is a mode for writing data to an NFC apparatus operating in CE mode. Moreover, an NFC apparatus operating in R/W mode can read data from an NFC tag, and write data to the NFC tag.

The NFC I/F 22 is an NFC forum device. The NFC I/F 22 sends e.g., a Polling signal and, in case of receiving a response signal to that signal from a partner apparatus, establishes an NFC communication link with the partner apparatus. Further, the NFC I/F 22 establishes an NFC communication link with the partner apparatus in case of, e.g., receiving a Polling signal from the partner apparatus, and sending a response signal to that signal to the partner apparatus.

Here, NFC communication will be described in detail. NFC communication is classified into four communication types (i.e., type A, type B, type F, and type V). The same frequency (i.e., 13.56 MHz) is used in each communication type. However, the combination of communication standard, modulation scheme, and coding scheme is different for each communication type. Type A is a communication conforming to communication standards "ISO/IEC14443 and 18092", modulation scheme "ASK (abbreviation of Amplitude Shift Keying) 100%", and coding scheme "Manchester". Type B is a communication conforming to communication standard "ISO/IEC14443", modulation scheme "ASK10%", and coding scheme "NRZ (abbreviation of Non Return to Zero)". Type F is a communication conforming to communication standard "ISO/IEC18092", modulation scheme "ASK10%", and coding scheme "Manchester". Type V is a communication conforming to communication standard "ISO/IEC15693", modulation scheme "ASK10% or 100%", and coding scheme "Manchester".

Next, differences between the Wi-Fi I/F 20 and the NFC I/F 22 will be described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave upon a Wi-Fi communication via the Wi-Fi I/F 20 (e.g. a 2.4 GHz band or 5.0 GHz band) is different from a frequency of a carrier wave upon an NFC communication via the NFC I/F 22 (e.g. a 13.56 MHz band). Further, a maximum distance with which a Wi-Fi communication that can be performed via the Wi-Fi I/F 20 (e.g., about 100 m at maximum) is longer than a maximum distance with which an NFC communication that can be performed via the NFC I/F 22 (e.g., about 10 cm at maximum).

The controller 30 comprises a CPU 32 and a memory 34. The CPU 32 performs various processes in accordance with a program 36 stored in the memory 34. The memory 34 is configured by a volatile memory, non-volatile memory, etc. Further, the memory 34 stores a user table 38. Moreover, in a modification, the user table 38 may be stored in a memory of an external device different from the scanner 10. In this case, the scanner 10 communicates with the external device, and can use the information in the user table 38.

A user name, a password, an authentication ID, and shortcut information are associated with each other in the user table 38. The user name, the password, and the shortcut information are registered in the user table 38 by, e.g., the administrator of the scanner 10 operating the operation unit 12, or accessing the scanner 10 from a terminal device.

The authentication ID is identification information for identifying the authentication card 50, and is extracted and registered from the authentication card 50 by a process to be described later. Here, the term "identification information" included as an example of the authentication ID may be information unique to one device, may be information identifying a component (e.g., software) in the device, or may be information indicating a model of the device. That is, the identification information is not restricted to information identifying one device itself, but also includes information identifying a certain concept.

The shortcut information includes scan setting information and destination information. The scan setting information is information indicating the scan setting to be used by the scan executing unit 18 for performing a scan of a document, and includes, e.g., number of colors, scan resolution, document size, file format of the scan data, etc. The destination information is information indicating the destination where the scan data is to be stored, and includes, e.g., a folder in the memory 34, an IP address of the external device, an email address, etc.

(Configuration of Authentication Card 50)

The authentication card 50 comprises an NFC I/F 52 which is an NFC tag. The authentication card 50 usually does not have OS software or an application. The NFC I/F 52 corresponds to one type of the types A, B, F, and V (in other words, supports only one type). The NFC I/F 52 corresponding to type A is an I/F (i.e., card) conforming to communication standard "ISO/IEC14443" and is further classified into an I/F conforming to specific standard "ISO/IEC14443-4" conforming to communication standard "ISO/IEC14443", and an I/F not conforming to specific standard "ISO/IEC14443-4". The former I/F is a Mifare Desfire type card conforming to a specific communication protocol "T-CL" for non-contact cards, and includes e.g., Mifare ProX, Mifare SmartMX, Mifare Desfire, etc. Further, the latter I/F is a Mifare (registered trademark) type card not conforming to the communication protocol "T-CL", and includes e.g., Mifare Ultralight, Mifare Mini, etc. The NFC I/F 52 corresponding to type F is a card conforming to communication standard "ISO/IEC18092", and is e.g., a card such as FeliCa Standard, FeliCa Lite, etc. Further, the NFC I/F 52 corresponding to type V is a card conforming to communication standard "ISO/IEC15693".

(Configuration of Mobile Terminal 70)

The mobile terminal 70 is a portable terminal device such as a mobile telephone, a smartphone, a PDA, a notebook PC, a tablet PC, a portable music playback device or a mobile movie playback device. The mobile terminal 70 comprises an NFC I/F 72 and OS software 74. The NFC I/F 72 is an NFC forum device. The OS software 74 is software for controlling various basic operations of the mobile terminal 70. Further, although not shown, the mobile terminal 70 further comprises a Wi-Fi I/F for performing Wi-Fi communication. The mobile terminal 70 may further comprise a scan application 76. The scan application 76 is an application for causing the scanner 10 to perform a scan function.

Figure 2:
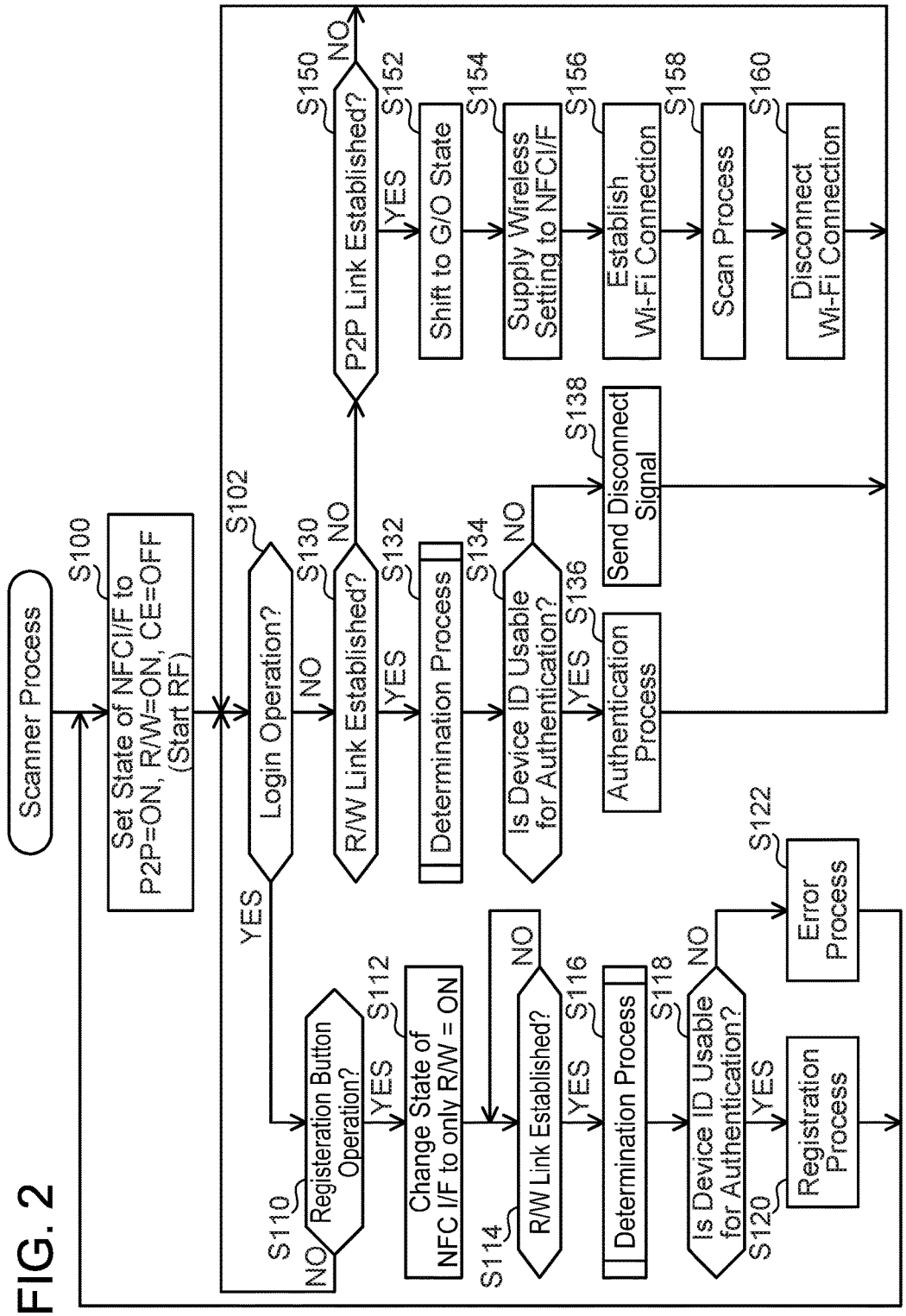
FIG. 2 shows a flowchart of a scanner process.

(Scanner Process; FIG. 2)

Next, a scanner process performed by the CPU 32 will be described with reference to FIG. 2. When the power of the scanner 10 is turned ON, the scanner process is started. Moreover, below, the authentication card 50 and the mobile terminal 70 may be collectively called "target device".

In S100, the CPU 32 sets the mode state of the NFC I/F 22 such that P2P mode and R/W mode are ON, and CE mode is OFF. In this case, the NFC I/F 22 can operate in P2P mode or R/W mode.

In S100, the CPU 32 further supplies an instruction to the NFC I/F 22 to turn ON RF (abbreviation of Radio Frequency). Thereby, the NFC I/F 22 shifts to a state capable of using radio waves. When the NFC I/F 22 comes to be in the state of being capable of using radio waves, the NFC I/F 22 repeatedly sends the four types of Polling signal corresponding to types A, B, F, and V in sequence.

In S102, the CPU 32 monitors whether a login operation has been performed on the operation unit 12 by the user. In a case where the combination of a user name and a password (called "user information" below) registered in the user table 38 has been input to the operation unit 12, the CPU 32 determines YES in S102, and proceeds to S110.

In S110, the CPU 32 determines whether or not the registration button for registering the authentication ID in the user table 38 has been operated. In case of determining that the registration button has been operated (YES in S110), the CPU 32 proceeds to S112. On the other hand, in case of determining that a button different from the registration button has been operated (NO in S110), the CPU 32 performs the process corresponding to that button, and returns to S102. In a case where e.g., a scan executing button has been operated, the CPU 32 acquires, from the user table 38, shortcut information associated with the user information input in S102. Then, the CPU 32 causes the scan executing unit 18 to perform a scan process complying with the scan setting information included in the shortcut information, and stores scan data at a destination complying with the destination information included in the shortcut information.

In S112, the CPU 32 sets the mode state of the NFC I/F 22 such that P2P mode and CE mode are OFF and R/W mode is ON. In this case, the NFC I/F 22 can operate only in R/W mode. In the present embodiment, in the case where the target device is the mobile terminal 70, a device ID is not extracted from the mobile terminal 70 or registered, and only in the case where the target device is the authentication card 50, the device ID is extracted from the authentication card 50 and registered. Consequently, a case where YES is determined in S110 is a situation in which establishing a communication link with the mobile terminal 70 is not necessary, and a communication link with the authentication card 50 should be established. Since the authentication card 50 cannot operate according to P2P mode, it is not necessary to have P2P mode on, and therefore P2P mode is turned OFF. Thereby, unnecessary communication corresponding to P2P mode does not have to be performed. Further, in the case where the target device is the authentication card 50, the NFC I/F 22 must operate in R/W mode (more specifically, Reader mode) in order to receive the device ID from the authentication card 50 (i.e., the NFC I/F 52 which is an NFC tag). Consequently, since the NFC I/F 22 must operate in R/W mode in order to receive the device ID from the authentication card 50, in S112, the NFC I/F 22 is set to a mode state capable of operating only in R/W mode.

In S114, the CPU 32 monitors whether a R/W link with the target device is established. The R/W link is a communication link in which the NFC I/F 22 of the scanner 10 operates in R/W mode, and the NFC I/F of the target device operates in CE mode. When the user brings the target device close to the scanner 10, the distance between the NFC I/F of the target device and the NFC I/F 22 of the scanner 10 becomes smaller than a maximum distance (e.g., 10 cm) at which NFC communication can be performed. In this case, the NFC I/F 22 receives a response signal to the Polling signal from the target device and, in consequence, a R/W link with the target device is established. In case of acquiring information from the NFC I/F 22 indicating that the R/W link has been established, the CPU 32 determines YES in S114, and proceeds to S116.

Here, communication layers of the NFC communication will be described. The communication layers of the NFC communication include an analog layer which is the lowest layer, a digital protocol layer which is an upper layer of the analog layer, an activity layer which is an upper layer of the digital protocol layer, and T1T to T5T layers which are upper layers of the activity layer. The signals for establishing the R/W link of S114 (e.g., Polling signal, response signal, etc.) are communicated by using the communication layers of the activity layer or lower without using the communication layers of the T1T to T5T layer or higher.

Figure 3:
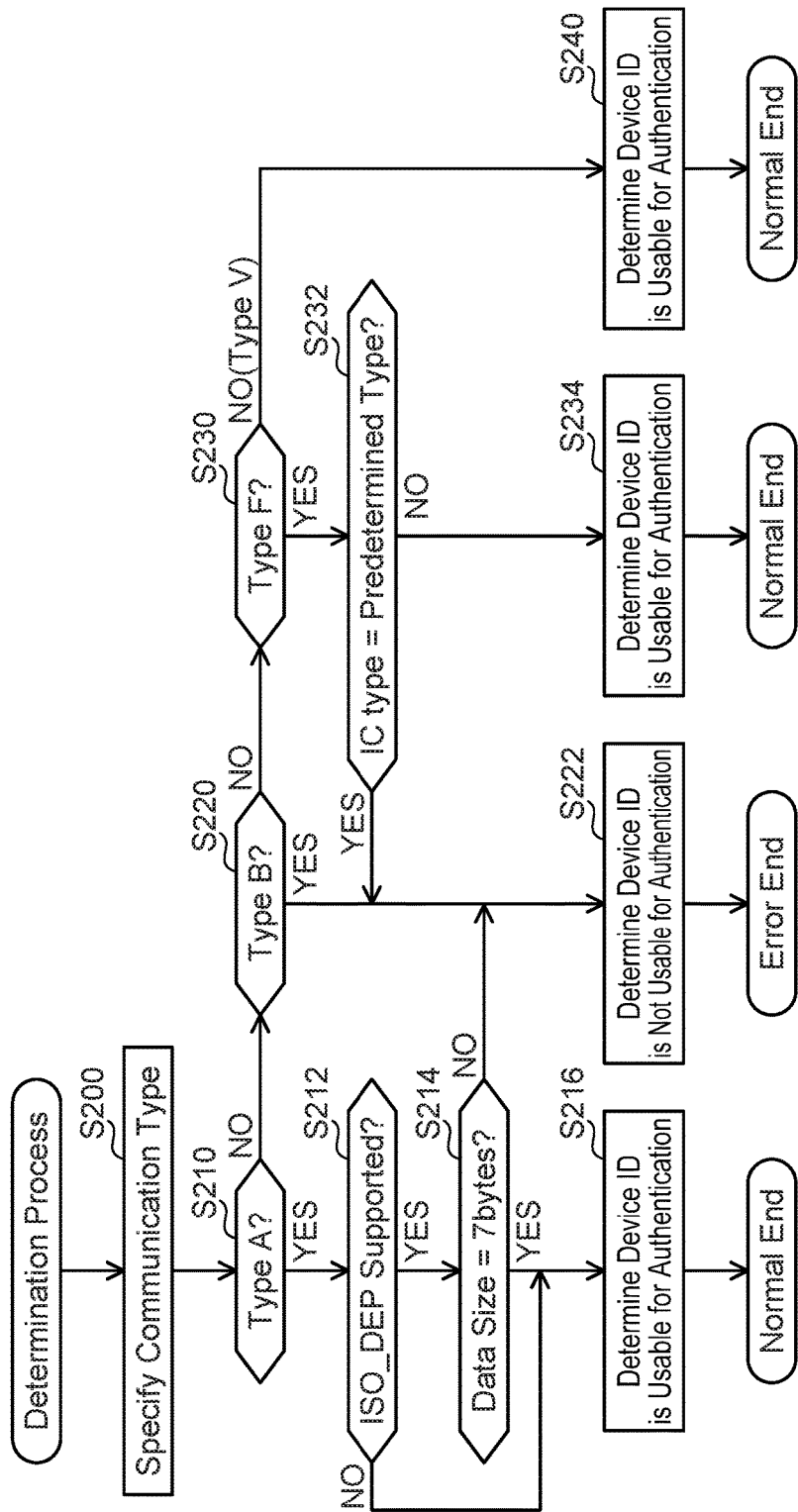
FIG. 3 shows a flowchart of a determination process.

In S116, the CPU 32 performs a determination process (to be described) for determining whether or not the device ID of the target device is usable for authentication (see FIG. 3). As a result of the determination process in S118, the CPU 32 proceeds to S120 in case of determining that the device ID of the target device is usable for authentication (YES in S118), and proceeds to S122 in case of determining that the device ID of the target device is not usable for authentication (NO in S118).

In S120, the CPU 32 registers the device ID of the target device in the user table 38 as the authentication ID corresponding to the user information input in S102. In a case where an authentication ID corresponding to the user information input in S102 has already been registered, in S120, the CPU 32 overwrites and registers the device ID of the target device as the authentication ID corresponding to the user information. Moreover, in a modification, in a case where the authentication ID corresponding to the user information input in S102 has already been registered, the CPU 32 may newly register, in the user table 38, new information in which the user information and the device ID of the target device are associated with one another. That is, in this case, a plurality of authentication IDs is registered for one piece of user information. When S120 ends, the CPU 32 returns to S100.

In S122, the CPU 32 causes the display unit 14 to display an error screen indicating that the registration of the authentication ID is impossible to be executed. Thereby, the user can know that the registration of the authentication ID has failed. When S124 ends, the CPU 32 returns to S100.

Further, in S130 and S150, the CPU 32 monitors whether a R/W link with the target device is established, and whether a P2P link with the target device is established. The P2P link is a communication link in which the NFC I/F 22 of the scanner 10 and the NFC I/F of the target device are each operating in P2P mode. In case of acquiring information from the NFC I/F 22 indicating that the R/W link has been established, the CPU 32 determines YES in S130, and proceeds to S132. Further, in case of acquiring information from the NFC I/F 22 indicating that the P2P link has been established, the CPU 32 determines YES in S150, and proceeds to S152. Moreover, the P2P link may be established due to receiving a response signal to the Polling signal sent from the NFC I/F 22, or may be established due to sending a response signal to the Polling signal sent from the target device. As in the case of the R/W link of S114, signals for establishing the communication links of S130 and S150 (e.g., Polling signal, response signal, etc.) are communicated by using the communication layers of the activity layer or lower without using the communication layers of the T1T to T5T layers or higher.

S132 and S134 are the same as S116 and S118. In case of determining that the device ID of the target device is usable for authentication (YES in S134), in S136 the CPU 32 authenticates the target device. Specifically, in a case where an authentication ID matching the device ID of the target device is registered in the user table 38, the CPU 32 determines that authentication succeeded. In this case, even if the scan executing button is not operated, the CPU 32 automatically performs the scan process by using the shortcut information corresponding to the authentication ID. The user can cause the scanner 10 to perform the scan process according to the shortcut information corresponding to the user merely by bringing the target device close to the scanner 10. Moreover, in a case where the authentication ID matching the device ID of the target device is not registered in the user table 38, the CPU 32 determines that authentication has failed, causes the display unit 14 to display, e.g., an error screen, and returns to S102. When S136 ends, the process returns to S102.

On the other hand, in case of determining that the device ID of the target device is not usable for authentication (NO in S134), in S138 the CPU 32 instructs the NFC I/F 22 to send a disconnect signal for disconnecting the R/W link established in S130 (specifically, a Deactivate signal). As a result, the NFC I/F 22 sends the disconnect signal to the target device, and the R/W link is disconnected. For example, a configuration of a comparative example is assumed in which the R/W link is disconnected by stopping the RF of the NFC I/F 22, or by stopping power supply to the NFC I/F 22. In this case, it is necessary to restart the RF or restart the power supply, and it takes a long time to return the NFC I/F 22 to the state of being able to send the Polling signal. Therefore, it takes a long time to re-establish a communication link with the target device. By contrast, in the present embodiment, the R/W link is disconnected in response to the sending of the disconnect signal, and consequently the communication link with the target device can be re-established more quickly than the comparative example. Moreover, in a modification, the R/W link may be disconnected by using the aforementioned configuration of the comparative example. When S138 ends, the process returns to S102.

Further, in a case where the P2P communication link with the target device is established (YES in S150), in S152, the CPU 32 shifts the operating state of the scanner 10 from device state of the WFD system to Group Owner state (called "G/O state" below) of the WFD system. Device state is a state of operating as neither a parent station nor child station of a wireless network conforming to the WFD system. G/O state is a state of operating as a parent station of the wireless network. Moreover, in a modification, instead of shifting to G/O state of the WFD system, the CPU 32 may activate a so-called Soft AP (abbreviation of Access Point), and operate as a parent station of the wireless network. In S152, the CPU 32 further determines wireless setting (i.e., SSID and password) to be used in the wireless network. The SSID is an identifier for identifying the wireless network. The password is a character string used for authentication and encryption in the wireless network. The CPU 32 determines the wireless setting by, e.g., acquiring a predetermined character string, or randomly extracting a character string.

In S154, the CPU 32 supplies the wireless setting determined in S152 to the NFC I/F 22. As a result, the NFC I/F 22 sends the wireless setting to the target device by using the P2P link. The wireless setting of S154 is sent by using the communication layers of the T1T to T5T or higher. In a case where the target device receives the wireless setting, and the target device comprises the scan application 76, the wireless setting is used in the target device. Then, various signals for establishing a Wi-Fi connection complying with the Wi-Fi system are sent to the scanner 10 from the target device.

In S156, the CPU 32 establishes the Wi-Fi connection with the target device via the Wi-Fi I/F 20. Specifically, the CPU 32 receives a signal including the aforementioned SSID, a signal including the password, etc., and establishes the Wi-Fi connection when authentication of the password succeeds.

In S158, the CPU 32 causes the scan executing unit 18 to perform the scan process. The CPU 32 may, e.g., cause the scan executing unit 18 to perform the scan process complying with a predetermined default scan setting, or may cause the scan executing unit 18 to perform the scan process complying with a scan setting received from the target device. Then, the CPU 32 sends scan data to the target device via the Wi-Fi I/F 20 by using the Wi-Fi connection established in S156. As described above, the communication speed of Wi-Fi communication is faster than the communication speed of NFC communication. Therefore, the scanner 10 can send the scan data to the target device more quickly than in a configuration where the scan data is communicated by using an NFC communication.

In S160, the CPU 32 disconnects the Wi-Fi connection established in S156 and, further, shifts the operating state of the scanner 10 from G/O state to device state. When S160 ends, the process returns to S102.

(Determination Process: FIG. 3, FIG. 4)

Next, the contents of a determination process performed in S116 or S132 of FIG. 2 will be described with reference to FIG. 3 and FIG. 4. By using the response signal received in S114 or S130, the CPU 32 determines whether or not a device ID included in the response signal is usable for authentication.

Prior to giving a description using FIG. 3 and FIG. 4, the response signal to the Polling signal corresponding to each communication type, and the device ID, will be described with reference to FIG. 5. As described above, the NFC I/F 22 repeatedly sends each Polling signal corresponding to each type in sequence. In a case where, e.g., a Polling signal corresponding to type A is sent and a response signal to that signal is received, the NFC I/F 22 supplies information indicating type A to the controller 30. Similarly, in case of receiving a response signal corresponding to another communication type, the NFC I/F 22 supplies information indicating that type to the controller 30. In response to acquiring the aforementioned information from the NFC I/F 22, the CPU 32 can know what communication type the response signal received corresponds to. Further, in the NFC standard, it is determined that a R/W link can be established regardless of which type of response signal, regardless of which communication types A, B, F, and V, is received. However, a P2P link can be established in a case of receiving a type A or F response signal, and cannot be established in a case of receiving a type B or V response signal.

The response signal of type A includes an SENS (abbreviation of SENS_RES Response) signal, an SDD (abbreviation of SDD_RES Response) signal, and an SEL (abbreviation of SEL_RES Response) signal. The SENS signal includes information indicating the data size of the NFCID1, which is the device ID of type A, and the SDD signal includes the NFCID1. The SEL signal includes sixth bit and seventh bit information. The SEL signal (i.e., SEL_RES Response) can also be called SAK (abbreviation of Select Acknowledge). The SENS signal and the SEL signal are attribute information indicating attributes of the target device (i.e., NFC I/F).

The sixth bit in the SEL signal indicates whether or not the target device supports ISO_DEP (abbreviation of Data Exchange Protocol defined in ISO/IEC14443-4). In a case where the sixth bit indicates "ON", the target device is compatible with ISO_DEP, and in a case where the sixth bit indicates "OFF", the target device does not support ISO_DEP. The target device supporting ISO_DEP means that the target device is the mobile terminal 70 or the Mifare Desfire type authentication card 50. Further, the target device not supporting ISO_DEP means that the target device is the Mifare type authentication card 50.

The seventh bit in the SEL signal indicates whether or not the target device supports NFC_DEP (abbreviation of Data Exchange Protocol defined in ISO/IEC18092). In a case where the seventh bit indicates "ON", the target device supports NFC_DEP, and in a case where the seventh bit indicates "OFF", the target device does not support NFC_DEP. The target device supporting NFC_DEP means that the target device is the mobile terminal 70 that is able to establish a P2P communication link complying with type A. Further, the target device not supporting NFC_DEP means that the target device is mobile terminal 70 that is unable to establish a P2P communication link complying with type A or the Mifare type, the Mifare Desfire type etc. authentication card 50.

The response signal of type B includes an SENSB signal, and the SENSB signal includes an NFCID0 which is the device ID of type B.

The response signal of type F includes an SENSF signal, and the SENSF signal includes P2P support information, a PAD0, and an NFCID2 which is the device ID of type F. The SENSF signal is attribute information indicating attributes of the target device (i.e., NFC I/F).

The P2P support information is information of the first byte and second byte at the head of the SENSF signal. A case where the P2P support information indicates "ON" means that the target device is the mobile terminal 70 that is able to establish a P2P link complying with to type F. A case where the P2P support information indicates "OFF" means that the target device is the mobile terminal 70 that is unable to establish a P2P link complying with to type F, or that the target device is the authentication card 50 such as FeliCa Standard, FeliCa Lite, etc.

The PAD0 includes information indicating the IC type of the NFC I/F of the target device, and can also be called PMm (abbreviation of Manufacture Parameter). A case where the PAD0 indicates 06h, 07h, 10h to 13h, and 14h to 1Fh (called "predetermined type" below) means that the target device is the mobile terminal 70. A case where the PAD0 indicates a type other than the aforementioned predetermined types means that the target device is the authentication card 50 such as FeliCa Standard, FeliCa Lite, etc. Moreover, the PAD0 is 2 byte information, and the information (06h, etc.) indicating the IC type described in the present disclosure and drawings indicates a part of the information included in the PAD0.

The response signal of type V includes an Inventory signal, and the Inventory signal includes an UID (abbreviation of Universal ID), which is the device ID of type V.

As described above, the device ID is an ID having a different name for each communication type. The device IDs corresponding to the communication types A, B, F, V are "NFCID1", "NFCID0", "NFCID2", and "UID", respectively. NFCID0 to 2 are regulated by the NFC forum, and the UID is not regulated by the NFC forum.

In the case where the target device is the authentication card 50, the device ID is pre-assigned to each card. In a case where the target device is the authentication card 50 corresponding to type A, F, or V, the device ID is a unique ID for each authentication card, and the device ID does not overlap between two or more authentication cards. Consequently, the device ID of the authentication card 50 corresponding to type A, F, or V is suitable for authentication. On the other hand, in the authentication card 50 corresponding to type B, the same device ID may be assigned to a plurality of authentication cards. Therefore, the device ID of the authentication card 50 corresponding to type B is not suitable for authentication.

Further, in the case where the target device is the mobile terminal 70, the device ID is prepared by the OS software 74. For example, when the SDD signal is to be sent, the OS software 74 randomly determines a character string, and determines the character string as the device ID. Therefore, if the device ID received from the mobile terminal 70 is registered in the user table 38 (S120 of FIG. 2), the device ID received from the mobile terminal 70 thereafter is usually different from the registered device ID. Therefore, the device ID received from the mobile terminal 70 is not suitable for authentication.

In S200 of FIG. 3, the CPU 32 specifies the communication type of the response signal. As described above, when the R/W link is established, the CPU 32 acquires information indicating communication type from the NFC I/F 22. The CPU 32 specifies the communication type of the response signal based on the information acquired from the NFC I/F 22. Then, in each of the following processes, the CPU 32 determines the type of the target device by using different methods according to the specified communication types, and then determines whether or not the device ID is usable for authentication. Therefore, it is possible to appropriately determine the type of the target device (i.e., whether the device ID is usable for authentication). Moreover, FIG. 4 is a table showing determination results of the processes below.

In S210, the CPU 32 determines whether or not the specified communication type is type A and, in case of determining YES in S210, in S212, the CPU 32 determines whether or not the target device supports ISO_DEP based on the sixth bit in the SEL signal. In a case where the sixth bit indicates "OFF", i.e., in a case of determining that the target device does not support ISO_DEP (NO in S212), the CPU 32 determines that the target device is the Mifare type authentication card 50, and proceeds to S216. In S216, the CPU 32 determines that the NFCID1 of the authentication card 50 is usable for authentication, and ends the process as Normal End. As a result, YES is determined in S118 or S134 of FIG. 2, and the NFCID1 in the SDD signal is extracted in S120 or S136.

On the other hand, in a case where the sixth bit indicates "ON", i.e., in a case of determining that the target device supports ISO_DEP (YES in S212), in S214, the CPU 32 determines whether the data size information in the SENS signal indicates 7 bytes or indicates 4 bytes. The Mifare Desfire type authentication card 50, and the mobile terminal 70 usually adopt the data size of 7 bytes and 4 bytes, respectively, as the NFCID1. Consequently, in a case where the data size information indicates 7 bytes (YES in S214), the CPU 32 determines that the target device is the Mifare Desfire type authentication card 50 and, in S216, determines that the NFCID1 of the authentication card 50 is usable for authentication. Further, in a case where the data size information indicates 4 bytes (NO in S214), the CPU 32 determines that the target device is the mobile terminal 70, and proceeds to S222. In S222, the CPU 32 determines that the NFCID1 of the mobile terminal 70 is not usable for authentication, and ends the process as Error End. As a result, NO is determined in S118 or S134 of FIG. 2, and S122 or S138 is performed. Moreover, the data size by which the target device is determined to be the Mifare Desfire type authentication card 50 (7 bytes in the present embodiment) is set based on the data size described in the Mifare specifications.

Further, in S220, the CPU 32 determines whether or not the specified communication type is type B and, in a case of determining YES in S220, proceeds to S222. As described above, in a case where the target device corresponds to type B, the NFCID0 which is the device ID of the target device is not suitable for authentication regardless of whether the target device is the authentication card 50 or the mobile terminal 70. Consequently, in S222, the CPU 32 determines that the device ID is not usable for authentication, and ends the process as Error End.

Further, in S230, the CPU 32 determines whether or not the specified communication type is type F and, in a case of determining YES in S230, in S232, the CPU 32 determines whether or not the NFC I/F of the target device is the predetermined type based on the PAD0 included in the SENSF signal. In a case where the PAD0 indicates the predetermined type (YES in S232), the CPU 32 determines that the target device is the mobile terminal 70 and, in S222, the CPU 32 determines that the NFCID0 of the mobile terminal 70 is not usable for authentication, and ends the process as Error End.

On the other hand, in a case where the PAD0 does not indicate the predetermined type (NO in S232), the CPU 32 determines that the target device is the authentication card 50 such as FeliCa Standard, FeliCa Lite, etc., and proceeds to S234. In S234, the CPU 32 determines that the NFCID2 of the authentication card 50 is usable for authentication, and ends the process as Normal End. As a result, YES is determined in S118 or S134 of FIG. 2, and the NFCID2 in the SENSF signal is extracted in S120 or S136.

Further, in a case where the specified communication type is type V (NO in S230), the CPU 32 determines that the target device is the authentication card 50, and proceeds to S240. In S240, the CPU 32 determines that the UID of the authentication card 50 is usable for authentication, and ends the process as Normal End. As a result, YES is determined in S118 or S134 of FIG. 2, and the UID in the Inventory signal is extracted in S120 or S136.

Figure 6:
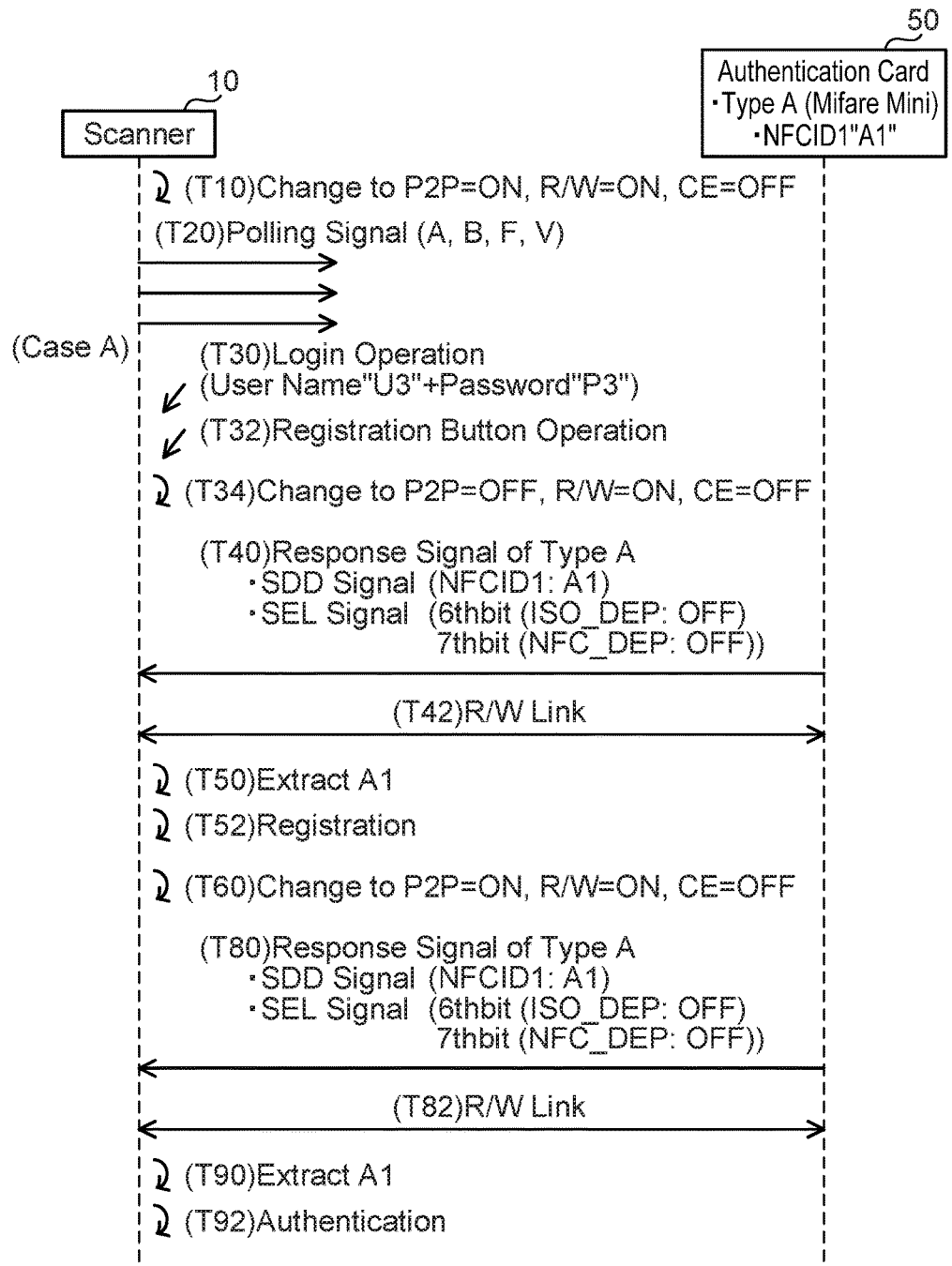
FIG. 6 shows a sequence view of a case where an authentication card corresponding to type A is a communication partner.

(Specific Cases; FIG. 6 to FIG. 8)

Next, specific cases A to C realized by the processes of FIG. 2 and FIG. 3 will be described with reference to FIG. 6 to FIG. 8.

(Case A; FIG. 6)

In T10, when the power is turned ON, the scanner 10 changes the mode state of the NFC I/F 22 to a mode state in which P2P mode and R/W mode are ON and CE mode is OFF (S100 of FIG. 2). In T20, the scanner 10 repeatedly sends the four types of Polling signal corresponding to the four types in sequence.

In case A, the target device is the authentication card 50 of which communication type corresponds to type A. The authentication card 50 is the Mifare Mini (i.e., Mifare type) authentication card 50, and an NFCID1 "A1" is pre-assigned thereto.

In T30, the scanner 10 accepts input (i.e., login operation) of the user information including the combination of a user name "U3" and a password "P3" (YES in S102) and, in T32, accepts an operation of the registration button (YES in S110). In this case, in T34, the scanner 10 changes the mode state of the NFC I/F 22 to a mode state in which R/W mode is ON and P2P mode and CE mode are OFF (S112).

In T40, in response to the sending of the Polling signal of type A, the scanner 10 receives, from the authentication card 50, a response signal of type A including an SDD signal including the NFCID1 "A1", and an SEL signal. In T42, the R/W link is established between the scanner 10 and the authentication card 50. At this occasion, the scanner 10 determines that the communication type of the response signal is type A (YES in S200, S210 of FIG. 3) and, since the sixth bit of the SEL signal indicates that ISO_DEP is not supported (NO in S212), the scanner 10 determines that the target device is the Mifare type authentication card 50. Then, the scanner 10 determines that the NFCID1 "A1" included in the SDD signal is usable for authentication (S216).

In T50, the scanner 10 extracts the NFCID1 "A1" from the SDD signal. Then, in T52, the scanner 10 registers the NFCID1 "A1" as the authentication ID in the user table 38 in association with the user information input in T30 (S120 of FIG. 2). Moreover, when T52 ends, the scanner 10 logs off the user logged in in T30. Then, in T60, the scanner 10 changes the mode state of the NFC I/F 22 to a mode state in which P2P mode and R/W mode are ON and CE mode is OFF (S100).

When the user again brings the authentication card 50 close to the scanner 10 after the registration of the authentication ID of the authentication card 50 in the user table 38 has been completed in T52, in T80, the scanner 10 receives a response signal of type A in the same manner as T40. Further, in T82, a R/W link is established between the scanner 10 and the authentication card 50 (YES in S130) in the same manner as T42. At this occasion, in the same manner as described above, the scanner 10 determines that the target device is the Mifare type authentication card 50, and determines that the NFCID1 "A1" is usable for authentication (S216).

In T90, the scanner 10 extracts the NFCID1 "A1". Since the authentication ID "A1" matching the extracted NFCID1 "A1" is registered in the user table 38 (see T52), in T92, the scanner 10 determines that authentication has succeeded (S136 of FIG. 2). In this case, the scanner 10 performs the scan process by using the shortcut information associated with the authentication ID "A1".

As described above, in the case where the R/W link with the authentication card 50 is established, the scanner 10 authenticates the authentication card 50, and performs the scan process by using the shortcut information. Consequently, in a case where each individual user uses the user's own authentication card 50, the scanner 10 can perform the scan process complying with that user.

(Cases B1 and B2: FIG. 7)

In cases B1 and B2, the target device is a mobile terminal 70A which is able to establish a P2P link of which communication type complies with type A. The mobile terminal 70A is able to establish a P2P link complying with type F. The mobile terminal 70A is further capable of sending response signals to each of Polling signals of at least type A and type F, and can operate as CE.

In T130 of case B1, in response to sending of a Polling signal of type A, the scanner 10 receives a response signal of type A including the SEL signal from the mobile terminal 70A. Since the mobile terminal 70A is able to establish a P2P link complying with type A, the seventh bit in the SEL signal indicates "ON". In this case, based on the seventh bit "ON", the NFC I/F 22 determines that the mobile terminal 70A is able to establish a P2P link complying with type A and, in T132, the NFC I/F 22 establishes a P2P link with the mobile terminal 70A (YES in S150 of FIG. 2). In this case, in T140 the scanner 10 performs the processes of S152 to S160 of FIG. 2.

In T230 of case B2, in response to sending of a Polling signal of type F, the scanner 10 receives a response signal of type F including the SENSF signal from the mobile terminal 70A. Since the mobile terminal 70A is unable to establish a P2P link complying with type F, the P2P support information in the SENSF signal indicates "OFF". In this case, based on the P2P support information "OFF", the NFC I/F 22 determines that the mobile terminal 70A is unable to establish a P2P link complying with type F, and does not establish a P2P link with the mobile terminal 70A. Then, in T232, the NFC I/F 22 establishes a R/W link with the mobile terminal 70A (YES in S130 of FIG. 2). In this case, the mobile terminal 70A operates in CE mode. At this occasion, the scanner 10 determines that the communication type of the response signal is type F (YES in S200, S230 of FIG. 3) and, since the PAD0 of the SENSF signal indicates the predetermined type (YES in S232), the scanner 10 determines that the target device is the mobile terminal 70A. Then, the scanner 10 determines that the NFCID2 included in the SENSF signal is not usable for authentication (S222).

In T240, the scanner 10 sends a disconnect signal to the mobile terminal 70A (S138 of FIG. 2). Thereby, the R/W link between the scanner 10 and the mobile terminal 70A is disconnected. Since the R/W link is disconnected, the scanner 10 resumes sending of each Polling signal corresponding to each type.

In a case where the user maintains a state of the mobile terminal 70A being close to the scanner 10, the scanner 10 may again receive a response signal of type F from the mobile terminal 70A in response to sending the Polling signal of type F. In this case, T232, T240 are performed again. On the other hand, as shown in T260, the scanner 10 may receive a response signal of type A from the mobile terminal 70A in response to sending of the Polling signal of type A. In this case, T262, T270 are performed, as in T132, T140.

In a case of wishing to send scan data to the mobile terminal 70A, the user brings the mobile terminal 70A close to the scanner 10. Here, in a case of the mobile terminal 70A sending a response signal of type A, a P2P link is established (T132), and sending of the wireless setting from the scanner 10 to the mobile terminal 70A (S154 of FIG. 2), and establishment of a Wi-Fi connection between the scanner 10 and the mobile terminal 70A (S156) are performed. Therefore, the scanner 10 can send the scan data to the mobile terminal 70A by using the Wi-Fi connection (S158).

On the other hand, in a case where the mobile terminal 70A sends a response signal of type F, a R/W link is established without a P2P link being established (T232). As described in case A of FIG. 6, the scanner 10 is configured to authenticate the target device in the case where the R/W link is established (YES in S130, S136 of FIG. 2). The device ID of the mobile terminal 70A is not suitable for authentication. Therefore, in the case where the R/W link with the mobile terminal 70A is established, the scanner 10 sends a disconnect signal to the mobile terminal 70A without performing authentication of the mobile terminal 70A, and disconnects the R/W link (T240). As described above, the mobile terminal 70A can send response signals to the Polling signals corresponding to type A and type F. The scanner 10 sends the four types of Polling signal in sequence, and the type of Polling signal received by the mobile terminal 70A varies according to the timing of receiving the Polling signal. Therefore, when the scanner 10 disconnects the R/W link with the mobile terminal 70A and resumes sending the Polling signals, the mobile terminal 70A may receive differing types of Polling signal. Thereby, since the mobile terminal 70A may send a response signal of type A, a P2P link with the mobile terminal 70A may be established (T262). As a result, the scanner 10 can appropriately send the scan data to the mobile terminal 70A by using the Wi-Fi connection (T270). Moreover, the P2P link may be established due to the scanner 10 sending a response signal to the Polling signal sent from the mobile terminal 70A.

Moreover, in a modification, the scanner 10 may stop sending of the Polling signal of type F until a predetermined period has elapsed since disconnecting the R/W link in T240. In this case, the scanner 10 can receive the response signal of type A from the mobile terminal 70A, and appropriately establish a P2P link, without receiving a response signal of type F from the mobile terminal 70A.

(Cases C1 and C2: FIG. 8)

In cases C1 and C2, the target device is a mobile terminal 70B of which communication type is able to establish a P2P link complying with type F. The mobile terminal 70B is unable to establish a P2P link complying with type A. The mobile terminal 70B can further send response signals to each of Polling signals of at least type A and type F, and can operate as CE.

In T330 of case C1, in response to sending of a Polling signal of type F, the scanner 10 receives a response signal of type F including the SENSF signal from the mobile terminal 70B. Since the mobile terminal 70B is able to establish a P2P link complying with type F, the P2P support information in the SENSF signal indicates "ON". In this case, based on the P2P support information "ON", the NFC I/F 22 determines that the mobile terminal 70B is able to establish a P2P link complying with type F and, in T332, the NFC I/F 22 establishes a P2P link with the mobile terminal 70B (YES in S150 of FIG. 2). In this case, in T340, the scanner 10 performs the processes of S152 to S160 of FIG. 2.

In T430 of case C2, in response to sending of a Polling signal of type A, the scanner 10 receives a response signal of type A including an SENS signal and an SEL signal from the mobile terminal 70B. Since the mobile terminal 70B is unable to establish a P2P link complying with type A, the seventh bit in the SEL signal indicates "OFF". In this case, based on the seventh bit "OFF", the NFC I/F 22 determines that the mobile terminal 70B is unable to establish a P2P link complying with type A, and does not establish a P2P link with the mobile terminal 70B. Then, in T432, the NFC I/F 22 establishes a R/W link with the mobile terminal 70B (YES in S130 of FIG. 2). In this case, the mobile terminal 70A operates in CE mode. At this occasion, the scanner 10 determines that the communication type of the response signal is type A (YES in S200, S210 of FIG. 3) and, since the sixth bit of the SEL signal indicates "ON" (YES in S212) and the data size information in the SENS signal indicates 4 bytes (NO in S214), the scanner 10 determines that the target device is the mobile terminal 70B. Then, the scanner 10 determines that the NFCID1 included in the SDD signal (not shown) is not usable for authentication (S222).

T440 is the same as T240 of FIG. 7. Then, as shown in T460, the scanner 10 may receive a response signal of type F from the mobile terminal 70B in response to sending a Polling signal of type F. In this case, T462, T470 are performed in the same manner as in T332, T340.

In the present case also, the same effect as in FIG. 7 can be obtained. That is, in a case where the R/W link with the mobile terminal 70B is established, the scanner 10 disconnects the R/W link (T440), and since the mobile terminal 70B may consequently send a response signal of type F, a P2P link with the mobile terminal 70B may be established (T462). Consequently, the scanner 10 can appropriately send the scan data to the mobile terminal 70B by using the Wi-Fi connection (T470).

Moreover, in a modification, the scanner 10 may stop sending the Polling signal of type A until a predetermined period has elapsed since disconnecting the R/W link in T440. In this case, the scanner 10 can receive the response signal of type F from the mobile terminal 70B, and appropriately establish a P2P link, without receiving a response signal of type A from the mobile terminal 70B.

Further, unlike the cases of FIG. 7 and FIG. 8, there is the possibility that the mobile terminal 70 is able to establish a P2P link complying with either type A or F. In this case, the scanner 10 can establish a P2P link with the mobile terminal 70 regardless of which response signal, type A or F, is received from the mobile terminal 70. As a result, the scanner 10 can send the wireless setting to the mobile terminal 70, and appropriately send the scan data to the mobile terminal 70 by using the Wi-Fi connection.

Effect of Present Embodiment

In the present embodiment, the scanner 10 switches processes according to the type of the target device. That is, in the case where the target device is the authentication card 50, the scanner 10 establishes the R/W link with the authentication card 50 and authenticates the authentication card 50 (S136 of FIG. 2) and, in the case where the target device is the mobile terminal 70, the scanner 10 establishes the P2P link with the mobile terminal 70, and sends the wireless setting to the mobile terminal 70 (S154). However, as described with reference to FIG. 7 and FIG. 8, the mobile terminals 70A, 70B may exist that are able to establish a P2P link complying with one communication type of types A and F, but are unable to establish a P2P link according to the other communication type of types A and F. Consequently, the scanner 10 may establish the R/W link with the mobile terminals 70A, 70B (T232 of FIG. 7, T432 of FIG. 8). In this case, the scanner 10 determines that the target device is the mobile terminals 70A, 70B (S222 after NO in S214 or after YES in S232 of FIG. 3), and disconnects the R/W link (T240 of FIG. 7, T440 of FIG. 8). As a result, the scanner 10 can appropriately establish a P2P link with the mobile terminals 70A, 70B (T262 of FIG. 7, T462 of FIG. 8). Thus, the scanner 10 can perform an appropriate process according to the type of the target device (i.e., the authentication card 50, the mobile terminal 70).

(Correspondence Relationship)

The scanner 10, the mobile terminal 70, and the authentication card 50 are an example of "communication device", "first type device" and "second type device", respectively. The NFC I/F 22 and the Wi-Fi I/F 20 are an example of "wireless interface" and "different interface", respectively. The P2P link and the R/W link are an example of "first type communication link" and "second type communication link", respectively. P2P and R/W are an example of "first mode" and "second mode", respectively. The respective response signals of FIG. 5 are examples of "specific signal". The NFCID1, the NFCID2, and the UID are examples of "identification information". The data size information in the SENS signal is an example of "first information", and 4 bytes, 7 bytes are an example of "first data size" and "second data size", respectively. The sixth bit in the SEL signal, and the PAD0 in the SENSF signal are an example of "second information" and "third information", respectively. ISO/IEC14443-4 is an example of "specific standard conforming to the predetermined standard". Sending the wireless setting from the NFC I/F 22 according to S154 of FIG. 2 is an example of "predetermined communication".

(Modification 1) For example, in an environment where the Mifare Desfire type authentication card is not used, S214 of FIG. 3 may be omitted and, in the case of YES in S212, it is determined that the target device is the mobile terminal 70, and S222 may be performed. That is, "determine which of the first type device or a second type device the target device is" may be performed by determining the type of the target device without using the "first information". Further, e.g., in an environment where the Mifare type authentication card is not used, S212 may be omitted, and the process of S214 may be performed. That is, "determine which of the first type device or a second type device the target device is" may be performed by determining the type of the target device without using the "second information". Further, e.g., in an environment where the target device corresponding to type F is not used, the processes of S230 to S234 may be omitted. That is, "determine which of the first type device or a second type device the target device is" may be performed by determining the type of the target device without using the "third information".

(Modification 2) For example, in an environment where only the target device corresponding to type A is used, in FIG. 3, only S212 to S216 and S222 may be performed. Further, e.g., in an environment where only the target device corresponding to type F is used, in FIG. 3, only S222, S232, and S234 may be performed. That is, "determine which of the first type device or a second type device the target device is" may be performed by determining the type of the target device without using different methods complying with the type of modulation scheme.

(Modification 3) Instead of S154 of FIG. 2, (Modification 3-1) to (Modification 3-4), below may be adopted.

(Modification 3-1) The CPU 32 supplies, to the NFC I/F 22, a wireless setting (e.g., SSID and password) of an AP (abbreviation of Access Point) to which the scanner 10 is connected. Thereby, the wireless setting is sent to the mobile terminal 70, and the mobile terminal 70 can establish a connection with the AP. In this case, in S158, the CPU 32 sends the scan data to the mobile terminal 70 via the AP. In the present modification, the sending of the wireless setting of the AP is an example of "predetermined communication".

(Modification 3-2) The CPU 32 may receive the wireless setting from the mobile terminal 70, which is in G/O state, without performing S152. Thereby, the CPU 32 establishes a connection with the mobile terminal 70 by using the wireless setting and, in S158, sends the scan data to the mobile terminal 70 by using the connection. In the present modification, the receiving of the wireless setting of the mobile terminal is an example of the "predetermined communication".

(Modification 3-3) The CPU 32 may receive, from the mobile terminal 70, the wireless setting of an AP to which the mobile terminal 70 is connected, without performing S152. Thereby, the CPU 32 establishes a connection with the AP by using the wireless setting and, in S158, sends the scan data to the mobile terminal 70 via the AP. In the present modification, the receiving of the wireless setting of the AP is an example of the "predetermined communication".

(Modification 3-4) Without performing S152 and S156 to S160, the CPU 32 may supply, to the NFC I/F 22, a URL (abbreviation of Uniform Resource Locator) of a web page for resolving error information occurring in the scanner 10. Thereby, the URL is sent to the mobile terminal 70, and the mobile terminal 70 can access the web page. In the present modification, the sending of the URL is an example of the "predetermined communication".

(Modification 4) The registration of the authentication ID in the user table 38 may be performed by an administrator operating the operation unit 12. In this case, S110 to S122 of FIG. 2 may be omitted.

(Modification 5) In S100 of FIG. 2, the CPU 32 may set the NFC I/F 22 to a mode state in which CE is further turned ON. Then, in S150, the CPU 32 may monitor that a CE link is established in which the NFC I/F 22 operates in CE and the mobile terminal 70 operates in R/W. In this case, the wireless setting is sent to the mobile terminal 70 by using the CE link. In the present modification, CE is an example of the "first mode".

(Modification 6) "Wireless interface" may not be an I/F for performing NFC communication, but may be an I/F for performing a wireless communication complying with another communication system, e.g., BlueTooth (registered trademark), TransferJet (registered trademark), etc.

(Modification 7) The "communication device" may not be the scanner 10 that is capable of performing the scan function, but may be a printer that is capable of performing a print function, a multi-function peripheral that is capable of performing a plurality of functions including the print function and the scan function, or another device (e.g., PC, mobile terminal, etc.). For example, instead of the shortcut information in the user table 38, the multi-function peripheral may store function information indicating function(s) usable by the user. In this case, when authentication of the authentication ID succeeds, the multi-function peripheral may allow the user to perform the function(s) indicated by the function information corresponding to that authentication ID, and may not allow the user to perform a function not indicated by the function information.

(Modification 8) For example, in a case where authentication information such as the device ID is written on a surface of the authentication card 50, the user or administrator may, e.g., operate the operation unit 12, and input the device ID to the scanner 10 to register the device ID in the user table 38 as the authentication ID. In this case, the processes of S102 to S122 of FIG. 2 may be omitted.

(Modification 9) In the above embodiments, each process of FIG. 2 to FIG. 3 is implemented by the CPU 32 of the scanner 10 performing the program 36 (i.e., software). Instead, at least one process of the processes of FIG. 2 to FIG. 3 may be implemented by hardware such as a logic circuit.

What is claimed is:

1. A communication device comprising:
a wireless interface configured to perform a wireless communication according to a predetermined standard;
a processor; and
a memory storing computer-readable instructions therein, the computer-readable instructions, when executed by the processor, causing the communication device to:
perform a predetermined communication using a first type communication link via the wireless interface with a target device being a first type device in a case where the first type communication link via the wireless interface is established between the communication device and the target device, the first type communication link being for the communication device to operate in a first mode defined by the predetermined standard;
determine, by using attribute information included in a specific signal that is received from the target device for establishing a second type communication link, which of the first type device or a second type device the target device is, in a case where the second type communication link via the wireless interface is established between the communication device and the target device, the second type communication link being for the communication device to operate in a second mode different from the first mode and defined by the predetermined standard;
execute an authentication of the target device being the second type device by using identification information included in the specific signal in a case where it is determined that the target device is the second type device;
disconnect the second type communication link without executing an authentication of the target device in a case where it is determined that the target device is the first type device; and
perform the predetermined communication using the first type communication link via the wireless interface with the target device being the first type device in a case where the first type communication link via the wireless interface is established between the communication device and the target device being the first type device after the second type communication link has been disconnected due to the determining that the target device is the first type device.

2. The communication device as in claim 1, wherein
the attribute information includes first information indicating a data size of the identification information included in the specific signal,
it is determined that the target device is the first type device in a case where the first information indicates that the data size of the identification information is a first data size; and
it is determined that the target device is the second type device in a case where the first information indicates that the data size of the identification information is a second data size different from the first data size.

3. The communication device as in claim 1, wherein
the attribute information includes second information indicating whether or not the target device is a device complying with a specific standard conforming to the predetermined standard,
it is determined that the target device is the first type device in a case where the second information indicates that the target device is the device complying with the specific standard,
it is determined that the target device is the second type device in a case where the second information indicates that the target device is not the device complying with the specific standard.

4. The communication device as in claim 1, wherein
the attribute information includes third information indicating an IC (abbreviation of Integrated Circuit) type of an interface of the target device,
it is determined that the target device is the first type device in a case where the third information indicates that the IC type is a predetermined type; and
it is determined that the target device is the second type device in a case where the third information indicates that the IC type is not the predetermined type.

5. The communication device as in claim 1, wherein
the determination is performed by using the attribute information and using a method according to a modulation scheme for receiving the specific signal.

6. The communication device as in claim 1, wherein
the computer-readable instructions, when executed by the processor, cause the communication device to:
send a disconnect signal for disconnecting the second type communication link to the target device so as to disconnect the second type communication link.

7. The communication device as in claim 1, wherein
the predetermined communication includes sending wireless setting information to the target device, and
the wireless setting information includes information for establishing a wireless connection via an interface different from the wireless interface between the communication device and the target device.

8. The communication device as in claim 1, wherein
the predetermined standard is an NFC (abbreviation of Near Field Communication) standard.

9. The communication device as in claim 8, wherein
the first mode is P2P (abbreviation of Peer to Peer) mode, and
the second mode is R/W (abbreviation of Reader/Writer) mode.

10. The communication device as in claim 1, wherein
the specific signal is received by using a first communication layer and not using a second communication layer that is higher than the first communication layer, and
the first type communication link and the second type communication link are established by using the second communication layer.

11. The communication device as in claim 1, wherein
the first type device is a terminal device, and
the second type device is a card.

12. A non-transitory computer-readable recording medium storing computer-readable instructions for a communication device,
wherein the computer-readable instructions, when executed by a processor of the communication device, causing the communication device to:
perform a predetermined communication using a first type communication link via a wireless interface with a target device being a first type device in a case where the first type communication link via the wireless interface is established between the communication device and the target device, the wireless interface being configured to perform a wireless communication according to a predetermined standard, and the first type communication link being for the communication device to operate in a first mode defined by the predetermined standard;
determine, by using attribute information included in a specific signal that is received from the target device for establishing a second type communication link, which of the first type device or a second type device the target device is, in a case where the second type communication link via the wireless interface is established between the communication device and the target device, the second type communication link being for the communication device to operate in a second mode different from the first mode and defined by the predetermined standard;
execute an authentication of the target device being the second type device by using identification information included in the specific signal in a case where it is determined that the target device is the second type device;
disconnect the second type communication link without executing an authentication of the target device in a case where it is determined that the target device is the first type device; and
perform the predetermined communication using the first type communication link via the wireless interface with the target device being the first type device in a case where the first type communication link via the wireless interface is established between the communication device and the target device being the first type device after the second type communication link has been disconnected due to the determining that the target device is the first type device.

13. A method performed by a communication device, the method comprising:
performing a predetermined communication using a first type communication link via a wireless interface with a target device being a first type device in a case where the first type communication link via the wireless interface is established between the communication device and the target device, the wireless interface being configured to perform a wireless communication according to a predetermined standard, and the first type communication link being for the communication device to operate in a first mode defined by the predetermined standard;
determining, by using attribute information included in a specific signal that is received from the target device for establishing a second type communication link, which of the first type device or a second type device the target device is, in a case where the second type communication link via the wireless interface is established between the communication device and the target device, the second type communication link being for the communication device to operate in a second mode different from the first mode and defined by the predetermined standard;
executing an authentication of the target device being the second type device by using identification information included in the specific signal in a case where it is determined that the target device is the second type device;

disconnecting the second type communication link without executing an authentication of the target device in a case where it is determined that the target device is the first type device; and performing the predetermined communication using the first type communication link via the wireless interface with the target device being the first type device in a case where the first type communication link via the wireless interface is established between the communication device and the target device being the first type device after the second type communication link has been disconnected due to the determining that the target device is the first type device.

\* \* \* \* \*